US010733241B2

(12) United States Patent
Govindarajan et al.

(10) Patent No.: US 10,733,241 B2
(45) Date of Patent: Aug. 4, 2020

(54) RE-INDEXING QUERY-INDEPENDENT DOCUMENT FEATURES FOR PROCESSING SEARCH QUERIES

(71) Applicant: salesforce.com, inc., San Francisco, CA (US)

(72) Inventors: Jayesh Govindarajan, Palo Alto, CA (US); Ammar Haris, Lake Forest Park, WA (US); Nicholas Beng Tek Geh, San Carlos, CA (US); Francisco Borges, Voorburg (NL)

(73) Assignee: salesforce.com, inc., San Francisco, CA (US)

( * ) Notice: Subject to any disclaimer, the term of this patent is extended or adjusted under 35 U.S.C. 154(b) by 409 days.

(21) Appl. No.: 15/730,574

(22) Filed: Oct. 11, 2017

(65) Prior Publication Data

US 2018/0101527 A1 Apr. 12, 2018

Related U.S. Application Data

(60) Provisional application No. 62/407,469, filed on Oct. 12, 2016.

(51) Int. Cl.
*G06F 17/00* (2019.01)
*G06F 16/93* (2019.01)
*G06F 16/248* (2019.01)
*G06F 16/958* (2019.01)
*G06F 16/332* (2019.01)

(52) U.S. Cl.
CPC ............ *G06F 16/93* (2019.01); *G06F 16/248* (2019.01); *G06F 16/3323* (2019.01); *G06F 16/986* (2019.01)

(58) Field of Classification Search
CPC .... G06F 16/93; G06F 16/986; G06F 16/3323; G06F 16/248
See application file for complete search history.

(56) References Cited

U.S. PATENT DOCUMENTS

| 6,067,541 | A | * | 5/2000 | Raju | ........................ G06F 16/10 |
| 2002/0138559 | A1 | * | 9/2002 | Ulrich | ...................... G06F 16/10 709/203 |
| 2003/0144990 | A1 | * | 7/2003 | Benelisha | ............. G06F 16/148 |
| 2007/0060114 | A1 | * | 3/2007 | Ramer | ................ G06F 16/9535 455/418 |
| 2007/0073651 | A1 | * | 3/2007 | Imielinski | ................ G06F 16/24 |
| 2007/0112844 | A1 | * | 5/2007 | Tribble | ................... G06F 16/48 |

(Continued)

*Primary Examiner* — Syed H Hasan
(74) *Attorney, Agent, or Firm* — Fenwick & West LLP

(57) ABSTRACT

An online system stores documents for access by users. The online system also stores query independent information about the documents. Query independent features include data that can be used to score or rank a document independent of any terms entered as a search query. The online system periodically determines whether the values of query independent features have changed, such as by checking activity logs. The online system updates records of query independent features accordingly, and sends information about the updated records to an enterprise search platform for re-indexing. When a user sends a search query to the online system, the enterprise search platform determines whether documents are relevant to the query based on the document contents and the query independent features associated with the documents.

18 Claims, 6 Drawing Sheets

Entity Store 221

| ID | Type | Document | Date Created |
|---|---|---|---|
| 1 | Text File | /path/to/doc/1 | 6/18/2015 |
| 7 | Text File | /path/to/doc/7 | 4/14/2001 |
| 2 | Text File | /path/to/doc/2 | 7/28/2017 |
| 6 | Text File | /path/to/doc/6 | 1/12/2016 |
| 5 | Text File | /path/to/doc/5 | 9/25/2017 |
| 4 | Text File | /path/to/doc/4 | 5/5/2017 |
| 3 | Text File | /path/to/doc/3 | 2/12/2016 |

QIR Feature Store 222

| ID | Views | Links to Entity | Edit Date | Popularity Score |
|---|---|---|---|---|
| 4 | 17 | 5 | 8/12/2016 | 5 |
| 7 | 3 | 0 | 10/2/2016 | 1 |
| 3 | 15 | 3 | 9/25/2017 | 3 |
| 1 | 6 | 1 | 2/3/2016 | 5 |
| 2 | 20 | 1 | 7/29/2017 | 5 |
| 5 | 3 | 7 | 9/25/2017 | 2 |
| 6 | 3 | 4 | 9/3/2017 | 4 |

Indexing Module 231

Search Index 232

(56) References Cited

U.S. PATENT DOCUMENTS

| | | | | |
|---|---|---|---|---|
| 2008/0072141 | A1* | 3/2008 | Hodel-Widmer | G06Q 10/10 715/255 |
| 2009/0234902 | A1* | 9/2009 | Pilosof | G06Q 10/06 709/201 |
| 2014/0006951 | A1* | 1/2014 | Hunter | H04H 60/31 715/719 |
| 2016/0350421 | A1* | 12/2016 | Multerer | G06F 16/955 |

* cited by examiner

RE-INDEXING QUERY-INDEPENDENT DOCUMENT FEATURES FOR PROCESSING SEARCH QUERIES

CROSS-REFERENCE TO RELATED APPLICATIONS

This application claims the benefit of U.S. Provisional Application No. 62/407,469, filed Oct. 12, 2016 which is incorporated by reference herein.

BACKGROUND

Field of Art

The described embodiments pertain in general to processing of search queries, and in particular to re-indexing query independent features for processing search queries in an enterprise search platform.

Description of the Relayed Art

Online systems store content accessible by users, such as documents, videos, and music files. When a user is interested in accessing information stored by an online system but the user doesn't know the specific document that includes the information or the storage location of the document, the user typically submits a search query to the online system. The online system returns search results to the user that include documents related to the search query.

To identify documents related to the search query, the online system can make an individual determination for each stored document as to whether it is related to the search query and whether it should be included in the search results. The online system can determine whether a document is relevant to a search query by comparing how closely terms in the document match terms in the search query. In this way, a document's relevance is determined based on the contents of the document itself, which may preclude some relevant documents from appearing high in a ranked list of search results. If the most relevant documents to the search query are not included at the top of the search results, this will contribute to the user having a negative experience.

Figure 1:
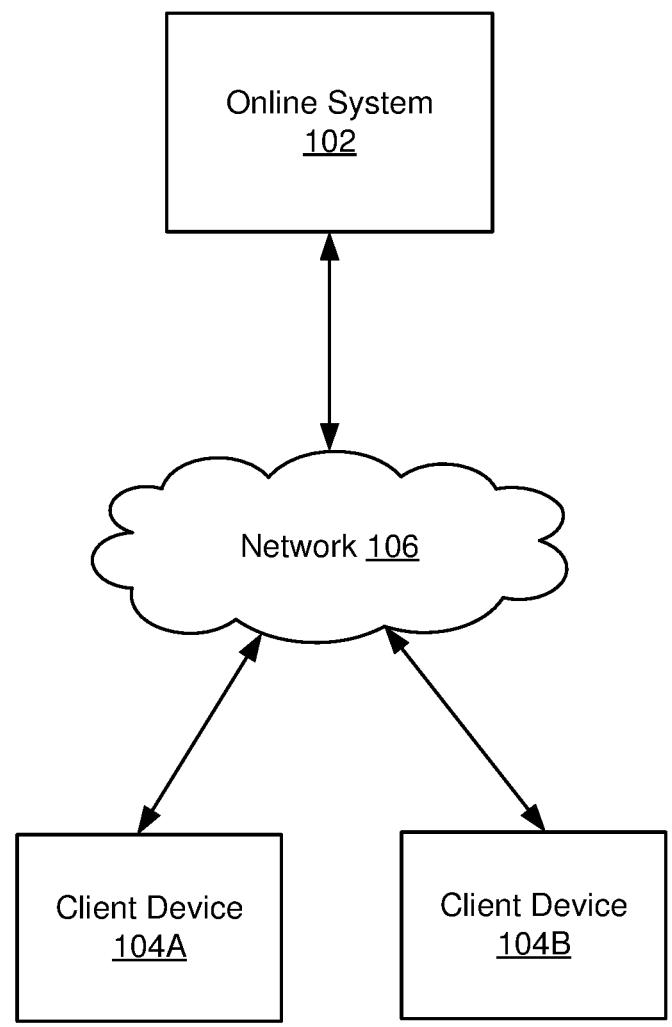
FIG. 1 is a block diagram of an online system environment according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

Overview

The embodiments described herein provide methods, computer program products, and computer database systems for providing an enterprise search platform index with information about updated records associated with documents. An online system provides users with access to online services. For example, the online system may be a web-based customer relationship management (CRM) system that provides employees of an enterprise with access to CRM documents and software applications. As part of providing services to users, the online system stores multiple documents that are accessible by users of the online system. The documents may be generated, for example, by users or administrators of the online system.

Information about documents on the online system is stored in data stores on database tables. Each record (e.g., row) in a database table may be associated with a document. The records include information about features of the document. For example, each field (e.g., column) of a record may be associated with a document feature. When a user of the online system enters a search query, the online system may provide a list of likely documents based on the user's search query. In some cases, the online system may determine document relevancy based on the contents of the document. Additionally, a document record in a database table may include information about query independent ranking (QIR) features associated with a document. A QIR feature is a document feature that contributes to the relevance of a document independently from any search terms entered in a search query. Examples of QIR features include document popularity, date of document creation, date of last edit to a document, number of links to a document, a number of views, parent-child linked document relationships, and the like.

The online system detects changes that have been made to documents and changes to QIR features related to documents. When a change is detected, the online system updates the records associated with the document and sends information about the updated records to an enterprise search platform. The enterprise search platform reindexes the information accordingly.

When the online system receives a search query from a user, the query is sent to the enterprise search platform which may score documents based on their relevancy to the search. The scores are based in part on query dependent information, such as scores generated using term frequency inverse document frequency (tf-idf) statistics. The document scores are also based on QIR features associated with the documents. For example, documents with more recent date of last edit may receive larger relevancy scores than documents with low popularity. The enterprise search platform provides document relevancy scores to the online system which may subsequently use the document relevancy scores to rank documents in a list of search results provided to the user who submitted the query.

Embodiments of the invention improve the efficiency of computation of ranking of the search results. For example, conventional techniques could perform ranking of the search results in an inefficient manner that slows down the processing of the search results. This provides poor user experience since a user has to wait for search results. Alternatively, or in addition, conventional techniques may provide poor ranking of the search results. This also provides poor user experience since a user may have to scroll much further down in a user interface searching for the right result or the user may never find the search results that the user was interested in. Embodiments of the invention accordingly provide a better user interface and a better user experience and also improve the efficiency of execution of the search process.

System Architecture

FIG. 1 is a block diagram of an online system environment 100 according to one embodiment. FIG. 1 illustrates an online system 102 and client devices 104A and 104B connected via a network 106. Although a select number of each entity are shown in FIG. 1, embodiments can have more or fewer of each entity (e.g., additional client devices 104).

The online system 102 is a computer system that provides services to users. In one embodiment, the online system 102 implements a web-based customer relationship management (CRM) system that provides users with CRM services. For example, in one embodiment, the online system 102 includes application servers configured to implement and execute CRM software applications. In other embodiments, the online system 102 provides other services or additional services that may include one or more of the following types of services: data storage, media hosting, online searching, social networking, shopping, advertising, news distribution, and so forth.

The online system 102 stores documents and document features. Documents, and other kinds of content may be provided by users or system administrators to the online system 102 for storage. Some examples of types of content that may be stored on the online system include webpages, mobile application pages, media items (e.g., videos, audio files, still images), documents, forms, social posts, presentations, spreadsheets, text files, calendar entries, tasks, objects, records, and other storable data.

In one embodiment, the online system 102 is a multi-tenant system that stores documents and other content for multiple tenants. Each tenant may be an enterprise and the users that store and/or access stored documents are associated with one of the enterprises (e.g., employees, contractors, or other representatives of an enterprise). For example, one tenant might be a company that employs a sales force where each salesperson communicates with the online system 102 to manage their sales process. Thus, a user might store documents or other objects that comprise contact information, sale leads, sales opportunities, customer follow-up data, performance data, goals, progress data, calendar entries, tasks, documents, social information, contracts, etc. In one embodiment, the online system 102 implements security protocols that keep documents, objects, data, applications, and application use separate for different tenants.

A client device 104 is a device used by a user to communicate with the online system 102. A client device 104 may be, for example, a desktop computer, laptop, smart phone, tablet computer, or personal digital assistant (PDA). A user communicates with the online system 102 through a client device 104 to use the services provided by the online system 102. As part of the services, the user may access documents stored by the online system 102. To identify a document (or other content) to retrieve, a user may provide through the client device 104 a search query to the online system 102. The client device 104 receives from the online system 102 search results related to the query. A search result identifies an object that the user can request to access. In one embodiment, a user may also use a client device 104 to provide a document or, another type of content, to the online system 102 for storage.

The network 106 represents the communication pathways between the online system 102 and client devices 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 106 can be represented using technologies and/or formats including the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
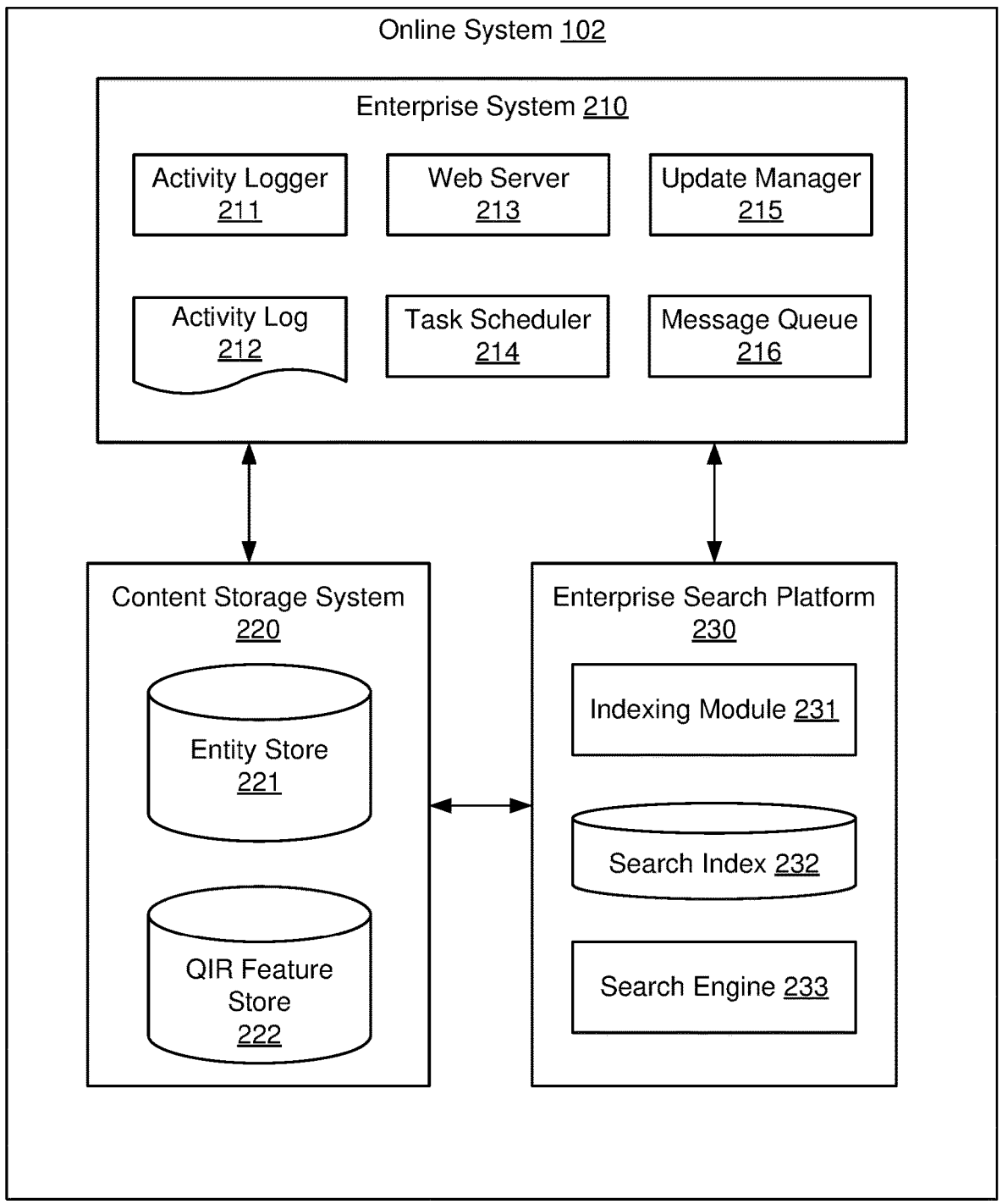
FIG. 2 is a block diagram illustrating components of an online system according to one embodiment.

FIG. 2 is a block diagram illustrating components of the online system 102 according to one embodiment. The online system 102 includes an enterprise system 210, a content storage system 220, and an enterprise search platform 230. Those of skill in the art will recognize that other embodiments can have different and/or other components than those described here, and that the functionalities can be distributed among the components in a different manner.

The enterprise system 210 includes components of the online system 102 that provide services to enterprises and interact with client devices 104 via the network 106. The enterprise system 210 includes an activity logger 211, an activity log 212, a web server 213, a task scheduler 214, an update manager 215, and a message queue 216.

The activity logger 211 populates the activity log 214 with information about user and system activities related to the online system 102. Examples of such activities include accessing a document, editing a document, uploading a document, submitting a search query, updating a component of the online system 102, clicking on a link, backing up data, and the like.

The activity log 212 stores data about the activities that are recorded by the activity logger 211. Information stored in the activity log 212 may be used by the online system 102 to determine whether features related to a document have changed. For example, an examination of the activity log 212 may reveal that a document has been accessed several times since the last time any records related to the document were updated. Thus, a field in a document record that keeps track of a number of times the document has been accessed should be updated.

The web server 213 links the online system 102 to one or more client devices 104 via the network 106. The web server 213 may serve web pages and other web-related content. The web server 213 may provide the functionality of receiving and routing requests and messages between the online system 102 and the client devices 104. For example, a user of a client device 104 can send a request to the web server to upload information (e.g., documents). Additionally, the web server 213 may provide API functionality to send data directly to native client device 104 operating systems.

The task scheduler 214 runs scheduled tasks. For example, a system administrator may configure the task scheduler 214 to initiate tasks at preferred times and preferred intervals. The task scheduler 214 may take the form of the cron software utility which executes scheduled commands periodically. Examples of tasks include system processes and programs. In one embodiment, the task scheduler 214 is configured to periodically run an update manager 215 to detect changes that have occurred in relation to documents stored on the online system 102.

The update manager 215 comprises one or more programs that are configured to detect changes that have been made to documents or system activities that may relate to documents. The update manager 215 is configured to inspect the activity log 212 to determine whether documents have been updated and whether activities have occurred to change QIR features associated with a document. In some embodiments, the update manager 215 updates information stored in records associated with a document, such as are stored in the content storage system 220. For example, if the activity log 212 shows (e.g., via a timestamp) that a document was viewed twice since the last time the update manager 215 inspected the activity log 212, the update manager 215 updates the record that indicates the number of total views of the document. In one embodiment, the update manager 215 can invoke an application programming interface (API) that includes functions for determining whether fields of a document record should be updated.

In one embodiment, a message queue 216 facilitates communication between the components of the online system 102. A message queue 216 is a software component used for asynchronous inter-process communications. The messages placed on the message queue 216 by a sending process may be stored on the message queue 216 until a receiving process retrieves the messages. For example, when the update manager 215 detects that there has been a change in the value of a feature associated with a document, the update manager 215 may place a message on the message queue 216, indicating to the content storage system 220 which records should be updated in the entity store 221 or the QIR feature store 222. In some embodiments, the content storage system 220 may similarly communicate with the enterprise search platform 230 about updated records that need to be re-indexed.

The content storage system 220 includes data stores that store document information. In one embodiment, the content storage system 220 includes an entity store 221 and a QIR feature store 222.

The entity store 221 is a data store for documents. The entity store 221 may additionally include other types of entities, such as video files, audio files, images, and enterprise-related objects. In some embodiments, the entity store 221 includes documents as well as information related to the documents, such as, for example, the date the document was created, the title of the document, and the length of the document. In one example embodiment, the data in the entity store 221 may be stored in the form of a database table.

The QIR feature store 222 stores QIR features related to documents in the entity store 221. For example, the QIR feature store 222 may store data about the popularity, number of views, and links to a document (i.e., links to the document from another document). As with the entity store 221, data in the QIR feature store 222 may be stored in the form of a database table. It is also possible for the information in the entity store 221 and the QIR feature store 222 to be stored together in one data store, for example in a single table, as joined, for example, by a document identifier. Additionally, it is possible for the information in the entity store 221 and the QIR feature store 222 to be separated into more than two databases, in various embodiments.

The enterprise search platform 230 comprises components for indexing documents and for determining relevancy scores based on search queries. The enterprise search platform 230 includes an indexing module 231, a search index 232, and a search engine 233.

The indexing module 231 indexes documents and document features received from the content storage system 220 and the enterprise system 210. Indexing documents and associated features may involve parsing the documents and features into machine readable formats, and storing the data such that it is efficiently and easily accessible. The search index 232 is a data store in which the indexing module 231 stores documents and information about document features.

The search engine 233 identifies documents stored in the search index 232 that are relevant to a search query. For example, when the enterprise system 210 receives a search query entered by a user, the enterprise system 210 may pass on the terms in the search query to the enterprise search platform 230 where the search engine 233 uses the search query terms to determine documents in the search index 232 that are relevant to the user's search. The relevancy of a document to the search may be based on the contents of the document itself and QIR features associated with the document.

Document relevancy may be determined by the search engine 233 in view of query dependent information such as matches and relationships between terms included in a document and terms included in a search query. One such metric for determining document relevancy is the term frequency-inverse document frequency (tf-idf). The tf-idf value is a numerical score that represents the importance of a word to a particular document in a set of documents. A tf-idf value tends to increase in proportion to the number of times a search term occurs in a document, but decreases based on the number of times the search term appears in the set of documents, thus adjusting for words that are generally frequently used.

Document relevancy may also be determined in view of query independent features, that is, QIR features associated with each document. A document may be scored by the search engine 233 based on QIR feature values stored in association with the document in the search index 232. For example, the document may be scored based on values representative of document popularity, number of document views, links to the document from other documents, and date of document creation.

The search engine 233 combines the query dependent scores and the query independent scores for a document to determine a final relevancy score for the document. In one embodiment, a final relevancy score may be a weighted sum of the QIR feature values and the tf-idf score. The weights associated with each QIR feature may be set by an enterprise administrator, in some embodiments. The search engine 233 notifies the enterprise system 210 about which documents are considered most relevant to the search query based on the final relevancy scores of documents. As one example, the search engine 233 may notify the enterprise system 210 about the documents with the highest final relevancy scores. Document relevancy is thus determined in view of the terms in the search query and in view of other known information about the document, such as QIR features.

Examples/Processes

Figure 3:
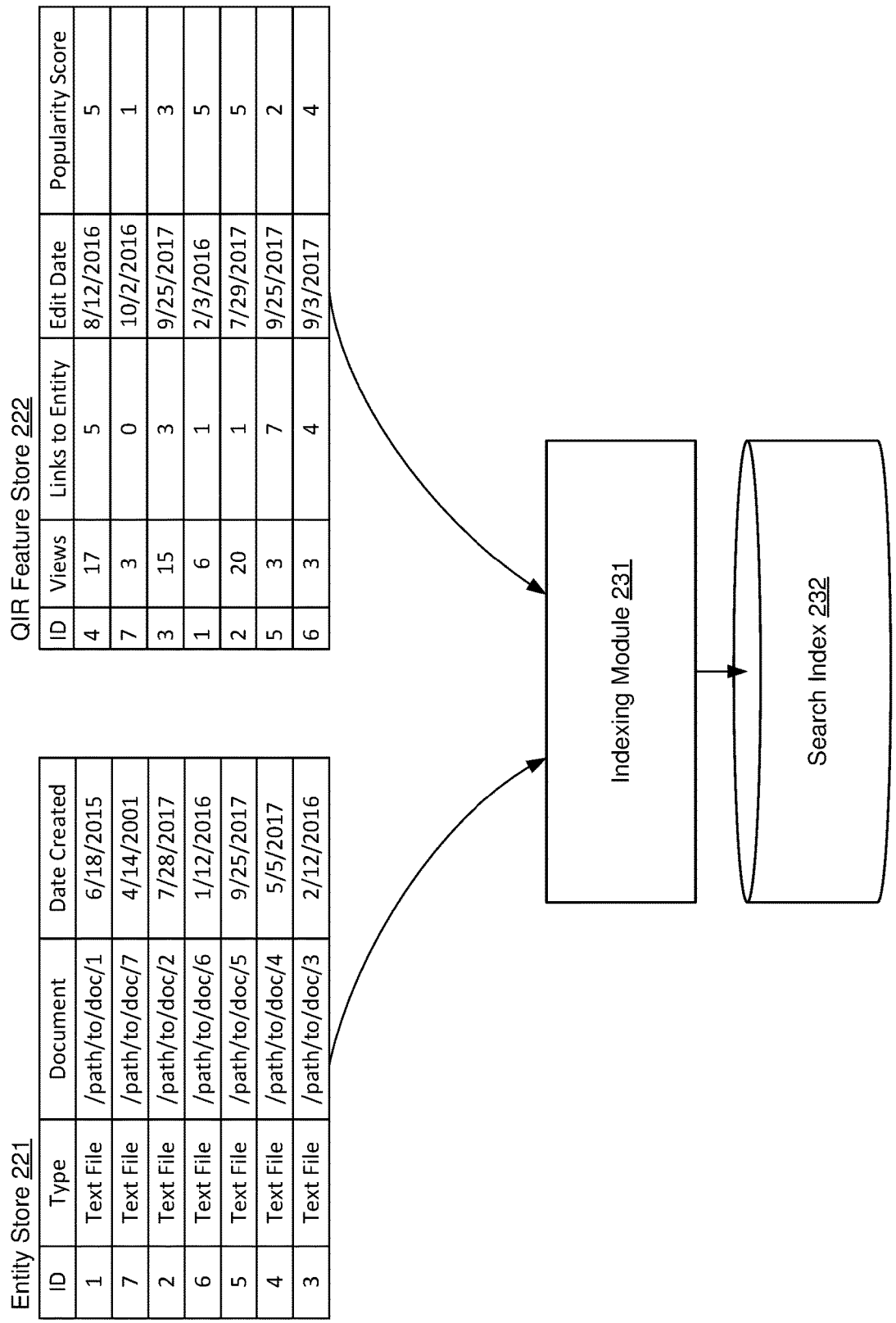
FIG. 3 is an example illustration of re-indexing a search index with updated information about a document according to an embodiment.

FIG. 3 is an example illustration of re-indexing a search index with updated information about a document according to an embodiment. Information about documents is stored as records in tables in the entity store 221 and the QIR feature store 222. For example, a record of a table in the entity store 221 may include a document ID, a file type, a path to the document (or the document itself), and the date of creation of the document. Similarly, a record of a table in the QIR feature store 222 may include a document ID, a number of times the document has been viewed, a number of links to the document, a date the document was last edited, an owner of the document, and a popularity score associated with the document. When the update manager 215 determines a change in the values of QIR features associated with a document, or when a document is added or edited, the content storage system 220 updates the information stored in the entity store 221 and the QIR feature store 222 accordingly. Updates to tables of the entity store 221 or the QIR feature store 222 trigger a partial or complete re-indexing of the search index 232 by the indexing module 231.

Figure 4:
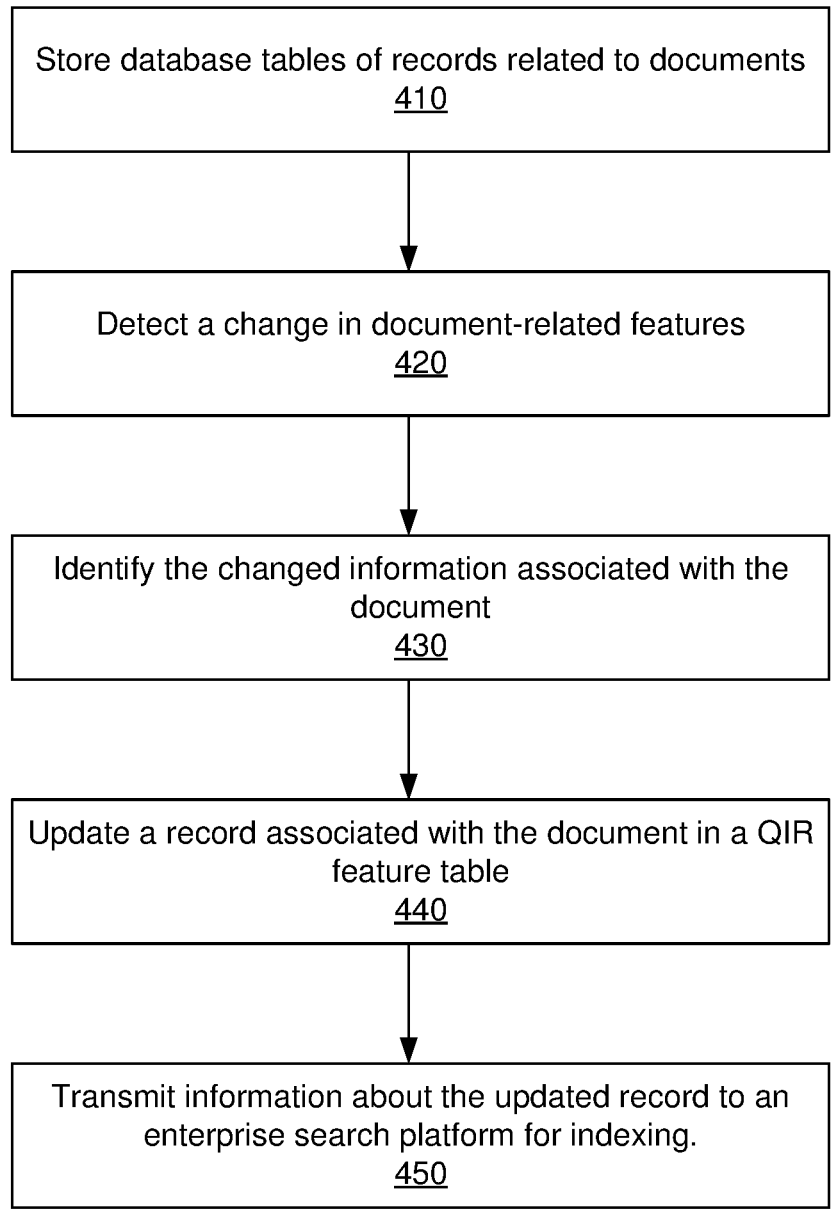
FIG. 4 is a process diagram that illustrates a process for updating system records about documents according to an embodiment.

FIG. 4 is a process diagram that illustrates a process for updating system records about documents according to an embodiment. Those of skill in the art will recognize that other embodiments can perform the steps of FIG. 4 in different orders. Moreover, other embodiments can include different and/or additional steps than those described herein.

The online system 102 stores 410 database tables of records related to documents. For example, the online system 102 may include an entity store 221 and a QIR feature store 222 that store documents and features related to the documents. An update manager 215 detects 420 changes in document related features and identifies 430 the changed information associated with the document. For example, the update manager 215 may consult the activity log 212 and determine that the number of times a document has been viewed has increased.

When a change in a document-related feature is detected, the online system 102 updates 440 a record associated with the document. If the change is related to the query-independent features associated with the document (e.g., number of views), the updated record is changed in the QIR feature store 222. The online system 102 transmits 450 information about the updated record to an enterprise search platform 230 for indexing within a search index 232.

Figure 5:
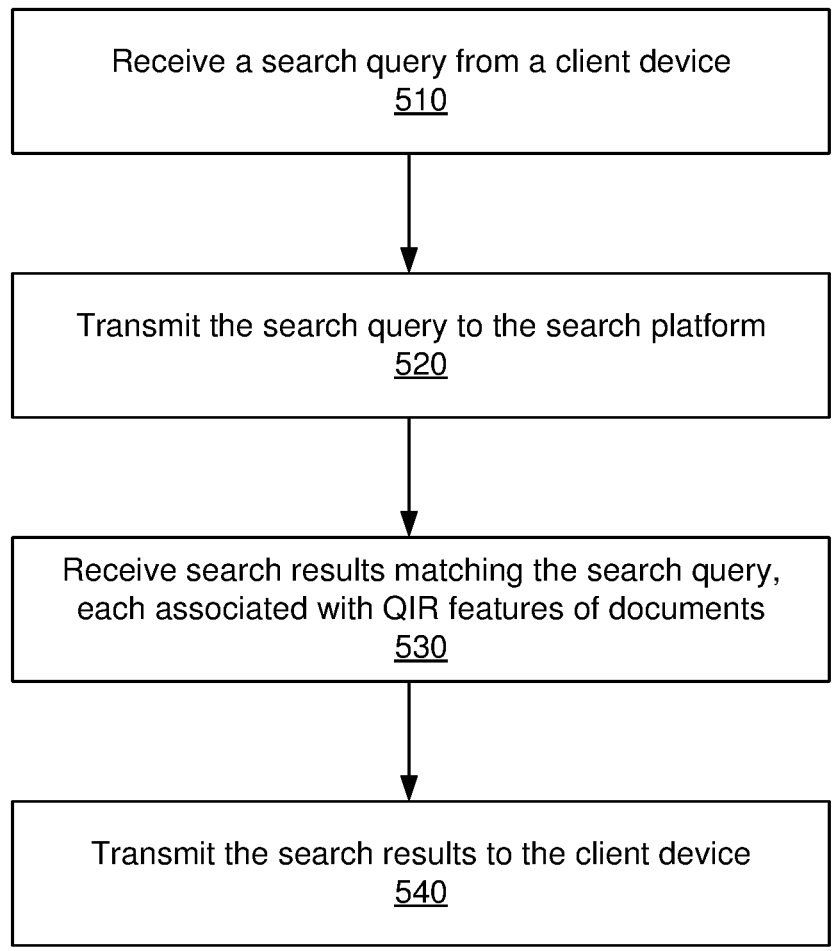
FIG. 5 is a process diagram that illustrates a process for determining document relevancy in view of a search query, according to an embodiment.

FIG. 5 is a process diagram that illustrates a process for determining document relevancy in view of a search query, according to an embodiment. Those of skill in the art will recognize that other embodiments can perform the steps of FIG. 5 in different orders. Moreover, other embodiments can include different and/or additional steps than those described herein.

The online system 102 receives 510 a search query from a client device 104. For example, a search query may be a collection of terms. The online system 102 transmits 520 the search query to the enterprise search platform 230, where the search engine 233 determines the relevancy of documents stored in the search index 232 to the search query. The online system receives 530 search results matching the search query, each search result associated with a document and based, at least in part, on QIR features associated with the document. That is, the search results may be ranked according to both a metric indicating a degree of match of terms in the search query with terms in the document and according to the value of the QIR features associated with the document. The online system 102 transmits 540 the search results to the client device 104. The client device 104 may display the results via a user interface, for example, in the form of a ranked list so that the user can view and access documents that are relevant to the search query.

Figure 6:
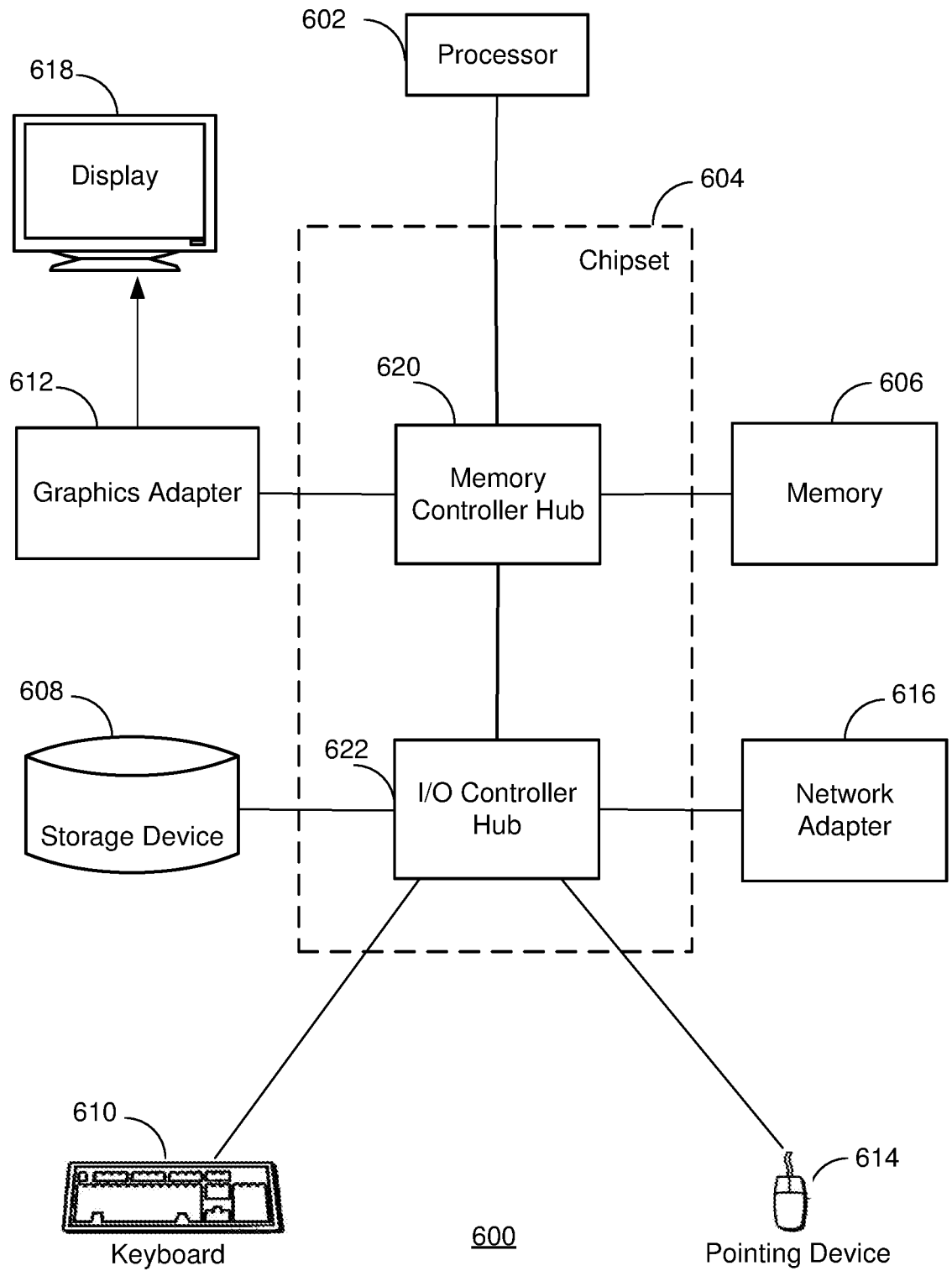
FIG. 6 is a high-level block diagram illustrating a functional view of a typical computer system for use as one of the entities illustrated in the environment of FIG. 1 according to an embodiment.

FIG. 6 is a high-level block diagram illustrating a functional view of a typical computer system 600 for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 106.

As is known in the art, a computer 600 can have different and/or other components than those shown in FIG. 6. In addition, the computer 600 can lack certain illustrated components. For example, a computer system 600 acting as an online system 102 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 104 may be a mobile phone with limited processing power, a small display 618, and may lack a pointing device 614. The online system 102, in contrast, may comprise multiple blade servers working together to provide the functionality described herein.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method comprising:
storing, by a multi-tenant system, a database table comprising records associated with a first tenant of the multi-tenant system, the multi-tenant system configured to store documents for a plurality of tenants, the multi-tenant system configured to allow users associated with a tenant to edit documents associated with the tenant, each record associated with a document and storing query-independent features describing the document, the query-independent features comprising an edit date of the document;
for a document associated with records in the database table:
  detecting a change in information associated with the document, the change associated with a last edit date of the document;
  updating in the database table, a record associated with the document to store query-independent features based on the changed information wherein the query independent features include the last edit date of the document, the last edit date corresponding to the change;
  transmitting query-independent features of the document to an enterprise search platform associated with the multi-tenant system, causing the enterprise search platform to re-index a record associated with the document associated with the first tenant; and
receiving, from a client device, a search request;
transmitting the search request to the enterprise search platform;
receiving, from the enterprise search platform, search results matching the search request, each search result associated with a relevancy score for a document from the documents associated with records in the database table, the relevancy score based on a weighted combination of updated query-independent features including at least an edit date of the document and a term frequency-inverse document frequency score associated with the document; and
transmitting, to the client device, the search results ranked based on the relevancy scores.

2. The computer-implemented method of claim 1, wherein a task scheduler periodically triggers the process of:
detecting a change in information associated with a document,
updating the database table, and
transmitting query-independent features of the document to the enterprise search platform for re-indexing.

3. The computer-implemented method of claim 1, wherein the query-independent features associated with documents include at least one of: a document popularity score, a number of times the document is viewed, or a number of times the document is linked to from other documents.

4. The computer-implemented method of claim 1, wherein the query independent features associated with documents include a creation date.

5. The computer-implemented method of claim 1, wherein the enterprise search platform performs a partial re-indexing of only the updated features in a record associated with the document.

6. The computer-implemented method of claim 1, wherein detecting a change in information associated with the document further comprises reviewing an activity log file and determining that activities indicated in the activity log file should change the value of a query-independent feature associated with the document.

7. A computer system comprising:
- at least once processor for executing computer program instructions; and
- a non-transitory computer-readable storage medium comprising stored instructions executable by the processor that when executed cause the processor to:
  - store, by a multi-tenant system, a database table comprising records associated with a first tenant of the multi-tenant system, the multi-tenant system configured to store documents for a plurality of tenants, the multi-tenant system configured to allow users associated with a tenant to edit documents associated with the tenant, each record associated with a document and storing query-independent features describing the document, the query-independent features comprising an edit date of the document;
  - for a document associated with records in the database table:
    - detect a change in information associated with the document, the change associated with a last edit date of the document;
    - update in the database table, a record associated with the document to store query-independent features based on the changed information wherein the query independent features include the last edit date of the document, the last edit date corresponding to the change;
    - transmit query-independent features of the document to an enterprise search platform associated with the multi-tenant system, causing the enterprise search platform to re-index a record associated with the document associated with the first tenant; and
  - receive, from a client device, a search request;
  - transmit the search request to the enterprise search platform;
  - receive, from the enterprise search platform, search results matching the search request, each search result associated with a relevancy score for a document from the documents associated with records in the database table, the relevancy score based on a weighted combination of updated query-independent features including at least an edit date of the document and a term frequency-inverse document frequency score associated with the document; and
  - transmit, to the client device, the search results ranked based on the relevancy scores.

8. The computer system of claim 7, wherein a task scheduler periodically triggers the process of:
- detecting a change in information associated with a document,
- updating the database table, and
- transmitting query-independent features of the document to the enterprise search platform for re-indexing.

9. The computer system of claim 7, wherein the query-independent features associated with documents include at least one of: a document popularity score, a number of times the document is viewed, or a number of times the document is linked to from other documents.

10. The computer system of claim 7, wherein the query independent features associated with documents include a creation date.

11. The computer system of claim 7, wherein the enterprise search platform performs a partial re-indexing of only the updated features in a record associated with the document.

12. The computer system of claim 7, wherein detecting a change in information associated with the document further comprises reviewing an activity log file and determining that activities indicated in the activity log file should change the value of a query-independent feature associated with the document.

13. A non-transitory computer readable storage medium comprising computer executable code that when executed by one or more processors causes the one or more processors to perform operations comprising:
- storing, by a multi-tenant system, a database table comprising records associated with a first tenant of the multi-tenant system, the multi-tenant system configured to store documents for a plurality of tenants, the multi-tenant system configured to allow users associated with a tenant to edit documents associated with the tenant, each record associated with a document and storing query-independent features describing the document, the query-independent features comprising an edit date of the document;
- for a document associated with records in the database table:
  - detecting a change in information associated with the document, the change associated with a last edit date of the document;
  - updating in the database table, a record associated with the document to store query-independent features based on the changed information wherein the query independent features include the last edit date of the document, the last edit date corresponding to the change;
  - transmitting query-independent features of the document to an enterprise search platform associated with the multi-tenant system, causing the enterprise search platform to re-index a record associated with the document associated with the first tenant; and
- receiving, from a client device, a search request;
- transmitting the search request to the enterprise search platform;
- receiving, from the enterprise search platform, search results matching the search request, each search result associated with a relevancy score for a document from the documents associated with records in the database table, the relevancy score based on a weighted combination of updated query-independent features including at least an edit date of the document and a term frequency-inverse document frequency score associated with the document; and
- transmitting, to the client device, the search results ranked based on the relevancy scores.

14. The non-transitory computer-readable storage medium of claim 13, wherein a task scheduler periodically triggers the process of:
- detecting a change in information associated with a document, updating the database table, and transmitting query-independent features of the document to the enterprise search platform for re-indexing.

15. The non-transitory computer-readable storage medium of claim 13, wherein the query-independent features associated with documents include at least one of: a document popularity score, a number of times the document is viewed, or a number of times the document is linked to from other documents.

16. The non-transitory computer-readable storage medium of claim 13, wherein the query independent features associated with documents include a creation date.

17. The non-transitory computer-readable storage medium of claim 13, wherein the enterprise search platform performs a partial re-indexing of only the updated features in a record associated with the document.

18. The non-transitory computer-readable storage medium of claim 13, wherein detecting a change in information associated with the document further comprises reviewing an activity log file and determining that activities indicated in the activity log file should change the value of a query-independent feature associated with the document.

* * * * *